United States Patent
Chasko

(10) Patent No.: US 11,411,953 B2
(45) Date of Patent: Aug. 9, 2022

(54) EXTENDING NETWORK SECURITY TO LOCALLY CONNECTED EDGE DEVICES

(71) Applicant: Landis+Gyr Innovations, Inc., Alpharetta, GA (US)

(72) Inventor: Stephen John Chasko, Marietta, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 172 days.

(21) Appl. No.: 16/867,345

(22) Filed: May 5, 2020

(65) Prior Publication Data

US 2020/0358767 A1    Nov. 12, 2020

Related U.S. Application Data

(60) Provisional application No. 62/843,764, filed on May 6, 2019.

(51) Int. Cl.
H04L 9/40    (2022.01)

(52) U.S. Cl.
CPC ........ *H04L 63/0876* (2013.01); *H04L 63/062* (2013.01); *H04L 63/20* (2013.01)

(58) Field of Classification Search
CPC ... H04L 63/0876; H04L 63/062; H04L 63/20; H04L 63/0281; H04L 63/0428;
(Continued)

(56) References Cited

U.S. PATENT DOCUMENTS

| 5,874,903 A | 2/1999 | Shuey et al. | |
| 6,751,729 B1 * | 6/2004 | Giniger | H04L 63/0272 |
| | | | 713/153 |

(Continued)

FOREIGN PATENT DOCUMENTS

| EP | 2506392 | 10/2012 |
| EP | 2543974 | 1/2013 |

(Continued)

OTHER PUBLICATIONS

"IP-Adresse", Wikipedia, Version Sep. 23, 2013, available online at https://de.wikipedia.org/w/index.php?title=IPAdresse&oldid=122801374, at least as early as Sep. 23, 2013, 11 pages (No English translation available).

(Continued)

*Primary Examiner* — Teshome Hailu
*Assistant Examiner* — Aubrey H Wyszynski
(74) *Attorney, Agent, or Firm* — Kilpatrick Townsend & Stockton LLP

(57) ABSTRACT

In some embodiments, a secure local connection between a network node of a network and an edge device attached to the network node is provided by extending the security of the network to this local connection. The edge device attached to the network node communicates with a network manager of the network to obtain security keys and security credentials for the edge device. Using the security keys and the security credentials, the edge device can establish a secure channel between the network node and the edge device over the local connection. The edge device further communicates with the network manager to exchange routing information and to obtain a network address for the edge device. The edge device can then communicate, through the network node, with other network nodes in the network using the security keys, the security credentials, and the network address.

19 Claims, 5 Drawing Sheets

(58) Field of Classification Search
CPC .......................... H04L 63/0853; H04W 12/50; H04W 12/069; G06F 21/445
USPC .......................................................... 726/6
See application file for complete search history.

(56) References Cited

U.S. PATENT DOCUMENTS

| | | | |
|---|---|---|---|
| 7,886,033 B2* | 2/2011 | Hopmann | H04L 41/0233 709/223 |
| 9,635,054 B2 | 4/2017 | Salazar et al. | |
| 9,900,296 B2 | 2/2018 | Salazar et al. | |
| 2006/0206433 A1 | 9/2006 | Scoggins | |
| 2006/0288209 A1 | 12/2006 | Vogler | |
| 2009/0034557 A1* | 2/2009 | Fluhrer | H04L 63/0272 370/474 |
| 2009/0088907 A1 | 4/2009 | Lewis et al. | |
| 2010/0060479 A1 | 3/2010 | Salter | |
| 2011/0317834 A1* | 12/2011 | Chaturvedi | H04L 63/061 380/255 |
| 2012/0137126 A1 | 5/2012 | Matsuoka et al. | |
| 2013/0254881 A1 | 9/2013 | Helmschmidt et al. | |
| 2013/0320776 A1 | 12/2013 | Cook | |
| 2017/0201382 A1* | 7/2017 | Lindteigen | H04L 9/3263 |

FOREIGN PATENT DOCUMENTS

| | | |
|---|---|---|
| EP | 2648170 | 10/2013 |
| JP | 2004348377 | 12/2004 |
| JP | 2006268411 | 10/2006 |
| JP | 2010049334 | 3/2010 |
| JP | 2012113670 | 6/2012 |
| WO | 2011064865 | 6/2011 |

OTHER PUBLICATIONS

"Lastenheft zur Beschreibung einer sicheren Anbindung von Gaszählern an Messsysteme nach Energiewirtschaftsgesetz. Version 0.15", DVGW Deutscher Verein des Gas- und Wasserfaches e.V, Oct. 17, 2012, 12 pages (No English translation available).

"Open Metering System Specification", vol. 1, General Part, Issue 1.4.0, Jan. 31, 2011, 22 pages.

"Technische Richtlinie BSI TR-03109-1 Version 1.0", available online at https://web.archive.org/web/20130708082029/https://www.bsi.bund.de/DE/Themen/SmartMeter/TechnRichtlinie/TR_node.html, at least as early as Aug. 7, 2013, 146 pages (No English translation available).

Keoh et al., "Securing the IP-based Internet of Things with DTLS", Internet Engineering Task Force, IEFT, draft-keoh-lwig-dtls-iot-02, Aug. 27, 2013, pp. 1-20.

Lee et al., "Secure DNS Name Autoconfiguration for IPv6 Internet-of-Things Devices", International Conference on Information and Communication Technology Convergence (ICTC), 2016, pp. 564-569.

International Patent Application No. PCT/US2020/031517, International Search Report and Written Opinion, dated Jul. 13, 2020, 14 pages.

Arkko et al., "MIKEY: Multimedia Internet KEYing", Retrieved from the Internet <URL: tools.ietf.org/html/rfc3830>;, 2004, pp. 1-66.

EuchneR , "HMAC-Authenticated Diffie-Hellman for Multimedia Internet KEYing (MIKEY)", Network Working Group, Available online at: tools.ietf.org/html/rfc4650, Sep. 2006, pp. 1-27.

Kim et al., "A Secure Smart-Metering Protocol Over Power-Line Communication", Power Delivery, IEEE Transactions, Retrieved from the Internet <URL: ieeexplore.ieee.org/xpls/abs_all.jsparnumber=5951817>,, Jul. 11, 2011, pp. 2370-2379.

Sarikaya , "Framework for Securely Setting Up Smart Objects draft-sarikaya-solace-setup-framework-00", Retrieved from the Internet <URL: tools.ietf.org/html/draft-sarikaya-soiace-setup-framework-00>;, Sep. 2012, pp. 1-18.

Yan et al., "A secure and reliable in-network collaborative communication scheme for advanced metering infrastructure in smart grid", Wireless Communications and Networking Conference (WCNC), Retrieved from the Internet <URL: ieeexplore.ieee.org/xpls/icp.jsparnumber=5779257&tag=1 >, Mar. 28-31, 2011, pp. 909-914.

\* cited by examiner

EXTENDING NETWORK SECURITY TO LOCALLY CONNECTED EDGE DEVICES

CROSS REFERENCE TO RELATED APPLICATIONS

This claims priority to U.S. Provisional Application No. 62/843,764, entitled "Extending Network Security to Locally Connected Edge Devices," filed on May 6, 2019, which is hereby incorporated in its entirety by this reference.

TECHNICAL FIELD

This disclosure relates generally to data communications and more particularly relates to securing communications within a network endpoint by securing the communications over a local connection to an edge device.

BACKGROUND

A network allows nodes in the network to communicate with each other. For example, a metering network may be used to communicate between a resource provider and devices that monitor and control resources, such as electricity, in a home or other location. A computer network allows computing devices to exchange data with each other. Network links between the nodes are typically secured so that the communications between network nodes can be protected against various attacks.

Network nodes sometimes are attached to edge devices (e.g., a metering network radio is attached to a metering device) through a local connection, such as a USB connection. These local connections often exist without any security controls and thus are vulnerable to attacks. Further, if an edge device is allowed to communicate with other network nodes on the network, the local connection between the edge device and the network node becomes an easy target for attacks. If the local connection is left unsecured, the security of the network will be compromised. Accordingly, it is important to secure the local connections between the network nodes and their respective edge devices.

SUMMARY

Systems and methods are disclosed for providing a secure local connection between a network node in a network and an edge device attached to the network node by extending the security of the network to this local connection. In one example, an edge device attached to a network node communicates with a network manager of the network to obtain security keys and security credentials for the edge device. Using the security keys and the security credentials, the edge device can establish a secure channel between the network node and the edge device over the local connection. The edge device further communicates with the network manager to exchange routing information and to obtain a network address for the edge device. The edge device can then communicate, through the network node, with other network nodes in the network using the security keys, the security credentials, and the network address.

In another example, a method includes authenticating, by an edge device connected to a network node of a network through a local connection, the edge device with a network manager of the network and receiving, by the edge device, device credentials and network keys issued by the network manager based on the authentication. The method further includes creating, by the edge device and the network node, a secure tunnel between the edge device and the network node using the device credentials and network keys of the network node and the edge device, establishing, by the edge device, a data link with the network; and communicating, by the edge device, with other devices on the network via the network node and based on the data link.

In an additional example, a system includes a network manager configured for managing communications between network devices of a network and an endpoint device in connection with the network manager through the network and managed by the network manager. The network devices comprise network nodes and edge devices. The endpoint device includes a network node connected to the network and configured to communicate with the network manager and other network devices. The network node having a first network address. The endpoint device further includes an edge device connected to the network node via a local connection and configured to communicate with the network node through the local connection. The edge device is configured for communicating with the network manager to obtain security keys and security credentials of the edge device; establishing a secure channel between the network node and the edge device over the local connection using the security keys and the security credentials; communicating with the network manager to exchange routing information and to obtain a second network address for the edge device; and communicating with another network device in the network using the security keys, the security credentials, and the second network address.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
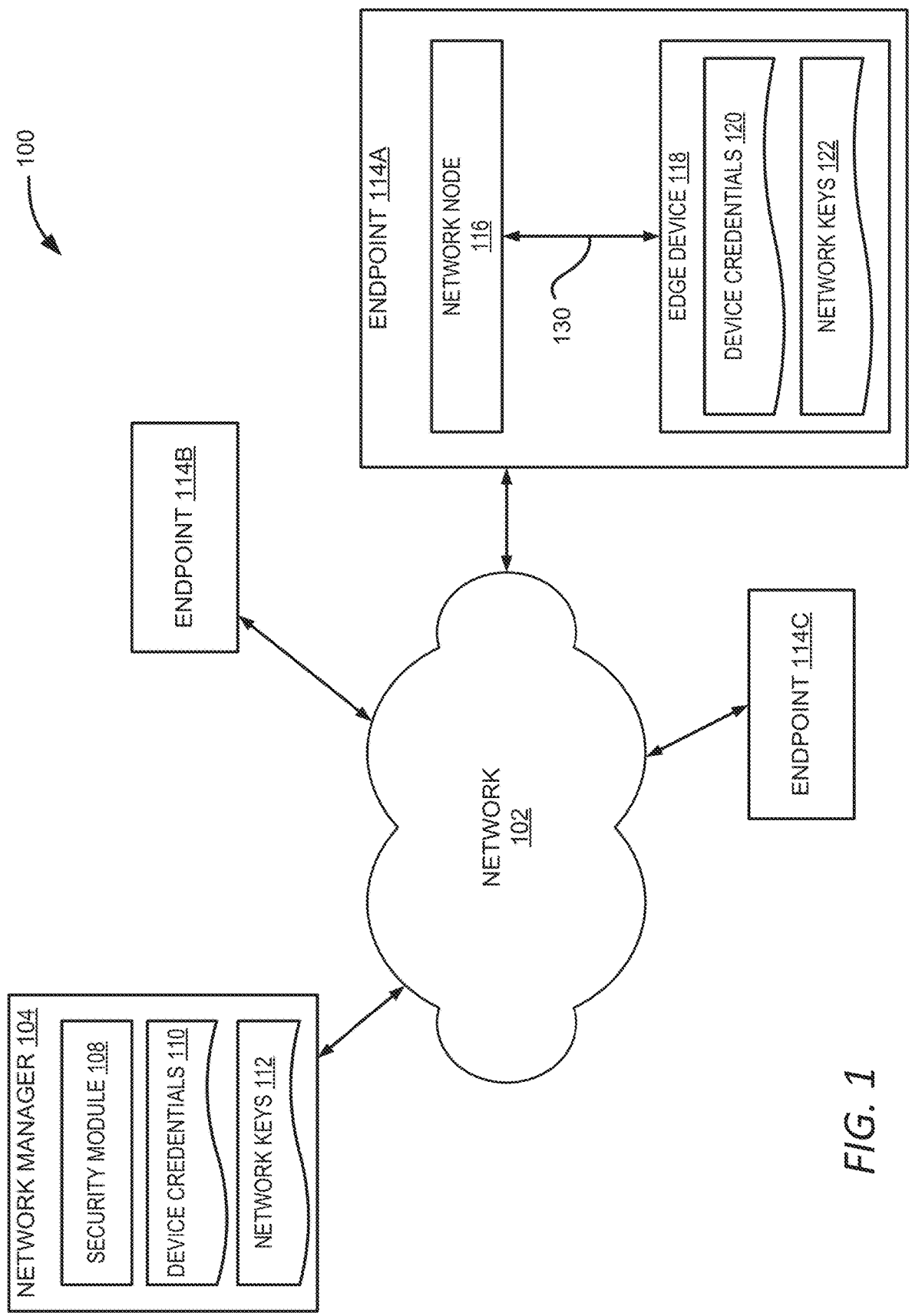
FIG. 1 is a diagram illustrating an example of a network that has extended network security over local connections between network nodes and edge devices, according to certain embodiments of the present disclosure.

Systems and methods are provided for securing a local connection between a network node in a network and an edge device attached to the network node. Security mechanisms of the network, such as security keys and credentials, are extended to the edge device across the local connection between the network node and the edge device. With these security credentials and keys, the edge device is able to securely interact with other devices on the network as if the edge device is a network node in the network. As a result, the communication between the network node and the edge device, as well as the communication between the edge device and other network devices, are protected as securely as the rest of the communications on the network.

In one example, the network includes multiple network nodes communicating with each other through the network. The network can be a mesh network, a Wi-Fi network, a cellular network, a power line carrier network, or any other wired or wireless network. The network further includes a network manager configured for, among others, managing the security aspects of the network, such as security keys and security credentials. When an edge device is attached to a network node through a local connection, such as a USB connection, RS232 serial port connection, peer to peer 900 Mhz RF connection, a Bluetooth connection, or digital inter-chip connections, the network node advertises the network to the edge device. The edge device contacts the network manager to obtain security keys for the network and security credentials for the edge device. With the security keys and the security credentials, a secure tunnel is established between the network node and the edge device where communication between the network node and the edge device is transmitted over the secure tunnel.

In order for the edge device to be able to communicate with other network nodes or devices on the network, the edge device associates itself to the network by communicating with the network manager to exchange routing information and to obtain a network address, such as an internet protocol (IP) address, a local area network (LAN) address or a combination thereof. After obtaining the network address and setting up the routing information, the edge device can be treated as a node on the network and can communicate with other network nodes or devices on the network securely through the network node that the edge device is connected to. In this way, the network node acts as a network router for routing network traffic directed to or coming from the edge device.

By extending the network security to a local connection between a network node and an edge device attached to the network node, the vulnerability of the network and the local connection is significantly reduced or even eliminated. The security of the communication over the local connection as well as the security of the communications in the network is thus significantly increased. Further, only minor changes need to be made to the network nodes in order to support secured local connection communication (e.g. changing the routing information in the network node so that traffic directed to the edge device can be delivered to the edge device). In addition, the techniques described herein can be applied to a wide variety of networks and local connections.

These illustrative examples are given to introduce the reader to the general subject matter discussed here and are not intended to limit the scope of the disclosed concepts. The following sections describe various additional aspects and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 is a diagram illustrating an example of an operating environment 100 where a network 102 supports secure communications between network devices including network nodes and edge devices, according to certain embodiments of the present disclosure. The network 102 includes multiple endpoints 114A-114C (which may be referred to herein individually as an endpoint 114 or collectively as the endpoints 114). An endpoint 114 includes a network node 116 that is configured to directly communicate with other network nodes on the network 102. The network node 116 can be a network card, a radio, or any other type of device that can communicate with other network nodes of the network 102.

The network 102 can be a radio frequency (RF) mesh network (such as an IEEE 802.15.4 network), a Wi-Fi network, a cellular network, a power line carrier network, or any other wired or wireless network. Correspondingly, the network node 116 can be an RF radio, a computer, a mobile device, a power line network device, or another type of devices that can directly communicate with other devices on the network 102.

The endpoint 114 may also include an edge device 118 that is attached to the network node 116 through a local connection 130. In one example of a mesh network, the edge device 118 can be a meter for measuring resources such as electricity, gas or water used at the premises where the meter is installed. In another example of a Wi-Fi network, the edge device 118 can be a computer or other devices plugged into the network node 116. Depending on the type the network node 116 and the edge device 118, the local connection 130 can be a USB connection, an RS232 serial port connection, peer to peer 900 Mhz RF connection, a Bluetooth connection, digital inter-chip connections, or any type of connections.

As used herein, an "endpoint" 114 includes a network node 116 and the edge device(s) 118 locally connected to the network node 116. Not all the endpoints 114 have a locally connected edge device 118. Some endpoints 114 may have multiple edge devices 118 locally connected to a network node 116. Although an edge device 118 is included in the same endpoint 114 as the network node 116 that it attaches to, by implementing the technologies presented herein, the edge device 118 appears as an independent network device on the network 102. As such, a network node 116 and an edge device 118 may each be referred to as a "network device" in the following description. In some implementations, the edge device 118 has its own IP address or its own LAN address or a combination of both. In other implementations, the edge device 118 is configured to operate outside of an IP network and communicate with message access control (MAC) layer messages.

To facilitate secure communications among the network devices, the network 102 also includes a network manager 104. The network manager 104 may include a security module 108 to maintain the security credentials 110 for the network devices and manage the network keys 112 used in the network 102. The security module 108 may also be configured to perform various security operations such as issuing security credentials and network keys to network devices and authenticating the network devices when they join the network 102, updating and revoking security credentials and network keys when needed, removing network devices from the network 102, and so on. The network manager 104 may also be configured to manage the routing of the network traffic. For example, when a new network device joins the network, the network manager 104 can communicate with the new network device to establish routing information and assign a network address for the new network device so that the network 102 is able to route network traffic directed to the new network device, such as an IP address, a LAN address or a combination thereof. In some implementations, the network manager 104 is an access point of the network 102, an authentication server, or a combination of both.

In some configurations, when an edge device 118 is connected to a network node 116 at an endpoint 114, the edge device 118 contacts, through the network node 116, the network manager 104 to obtain device credentials 120 and network keys 122 for the edge device 118. Using the device credentials 120 and network keys 122 of the edge device 118 and the device credentials and network keys of the network node 116, a secure tunnel between the network node 116 and the edge device 118 can be established for secure communication over the local connection 130. In other words, the device credentials and network keys created for the network 102 are used in the communication over the local connection 130 thereby extending the network security to the local connection 130.

To allow the edge device 118 to communicate as a network device on the network 102, the edge device 118 further communicates, through the network node 116, with the network manager 104 to obtain network configuration, routing information, and a network address. Because the edge device 118 might not have the capability to directly communicate on the network 102, the communication between the edge device 118 and other network devices may pass through the network node 116. For example, the edge device 118 may be a metering device configured for measuring the resources consumed at a location and may not be configured with a radio or a communication module. In order for the metering device to transmit the measured data and other data to other meters or a headend system, the metering device is attached to a radio that can communicate with other radios in the network, e.g. in a 900 MHz RF mesh network. Similarly, other metering devices at other locations can be attached to respective radios for communication over the mesh network.

In these scenarios, even though the edge device 118 obtains device credentials 120 and network keys 122 from the network 102, the network traffic to and from the edge device 118 still passes through the network node 116. In other words, the network traffic directed to the edge device 118 is received by the network node 116 first from the network 102 and then transmitted to the edge device 118 through the secure tunnel between the network node 116 and the edge device 118. Likewise, the network traffic originated from the edge device 118 is received by the network node 116 through the secure tunnel first and then transmitted to the destination in the network 102 by the network node 116. To achieve this, the routing information of the network 102 can specify that the edge device 118 is reachable through the network node 116. To the network 102, the network node 116 behaves like a router and other network devices on the network 102 can communicate with the edge device 118 as normal. Additional details regarding extending the network security to local connections between a network node and an edge device are provided below with regard to FIGS. 1-4.

Figure 2:
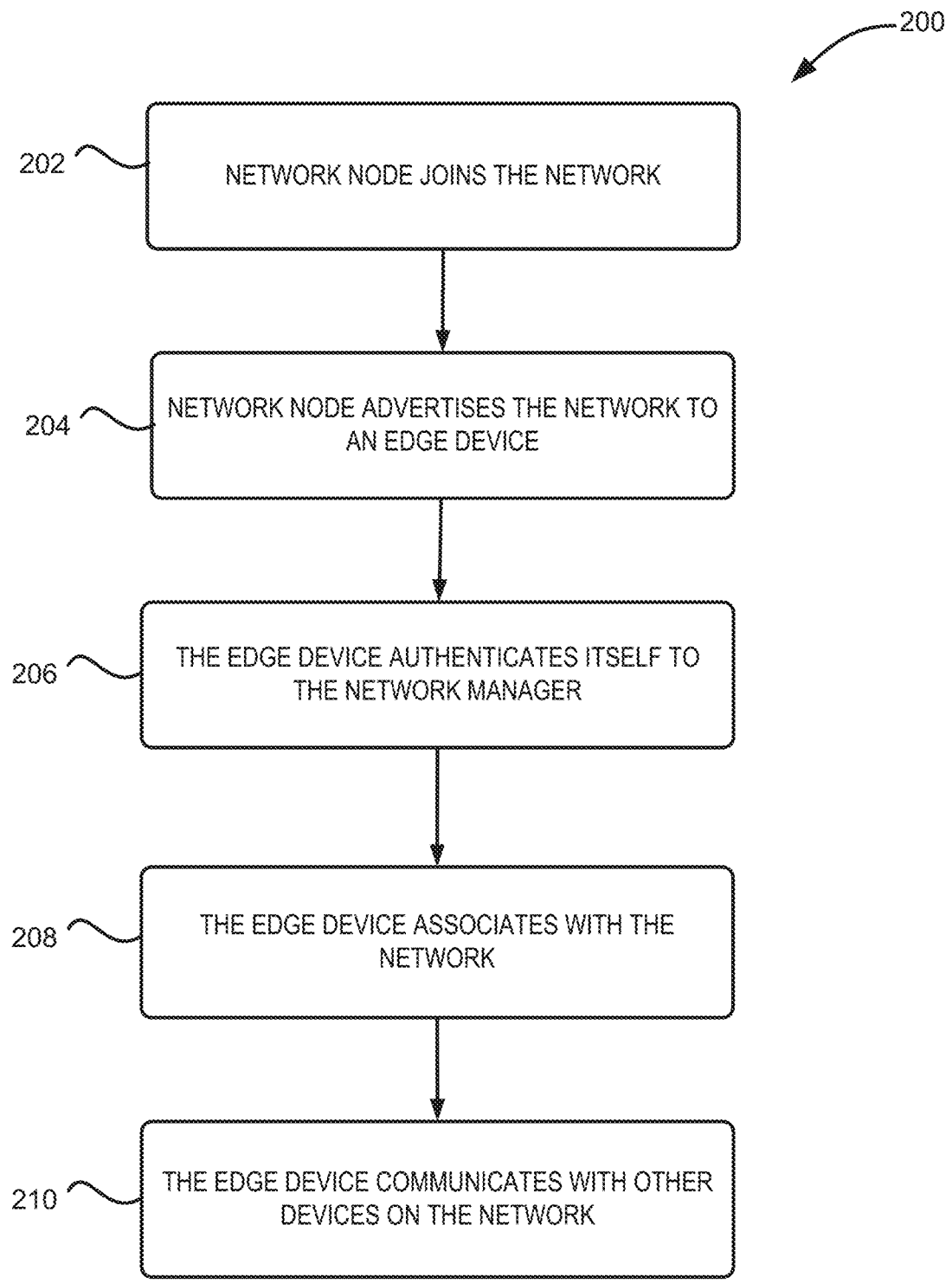
FIG. 2 is a flowchart illustrating an example of a process for extending network security to the local connection between a network node and an edge device, according to certain embodiments of the present disclosure.

FIG. 2 depicts a flowchart illustrating an example of a process 200 for extending network security to a local connection between a network node 116 and an edge device 118 of an endpoint 114, according to certain embodiments of the present disclosure. One or more devices (e.g., the network node 116 and the edge device 118) implement operations depicted in FIG. 2 by executing suitable program code. For illustrative purposes, process 200 is described with reference to certain examples depicted in the figures. Other implementations, however, are possible.

At block 202, the network node 116 joins the network 102 by following the normal operations and communications defined by the network protocol implemented in the network 102, including, for example, network advertisement, network node authentication, network key exchange, network node association, etc. At block 204, the network node 116 advertises the network 102 to the edge device 118 that has been connected to it through the local connection 130. The advertisement can include an identification of the network 102, and information about the network, such as the supported data rates, security requirements, etc.

Based on the information contained in the network advertisement, at block 206, the edge device 118 is able to identify the network manager 104 and to communicate with the network manager 104 to authenticate itself. The network manager 104, upon authenticating the edge device 118, can issue device credentials and send network keys used in the network 102 to the edge device 118. With the device credentials 120 and network keys 122, the network node 116 and the edge device 118 can create a secure tunnel between them so that the communication over the local connection 130 is protected.

At block 208, the edge device 118 associates itself with the network 102, i.e. establishes a data link between the edge device 118 and the network 102. For example, the edge device 118 can obtain configuration data from the network manager 104, exchange routing information with the network manager 104 and obtain a network address from the network manager 104. After the edge device 118 is associated with the network 102, at block 210, the edge device 118 starts to communicate with other devices on the network 102.

Figure 3:
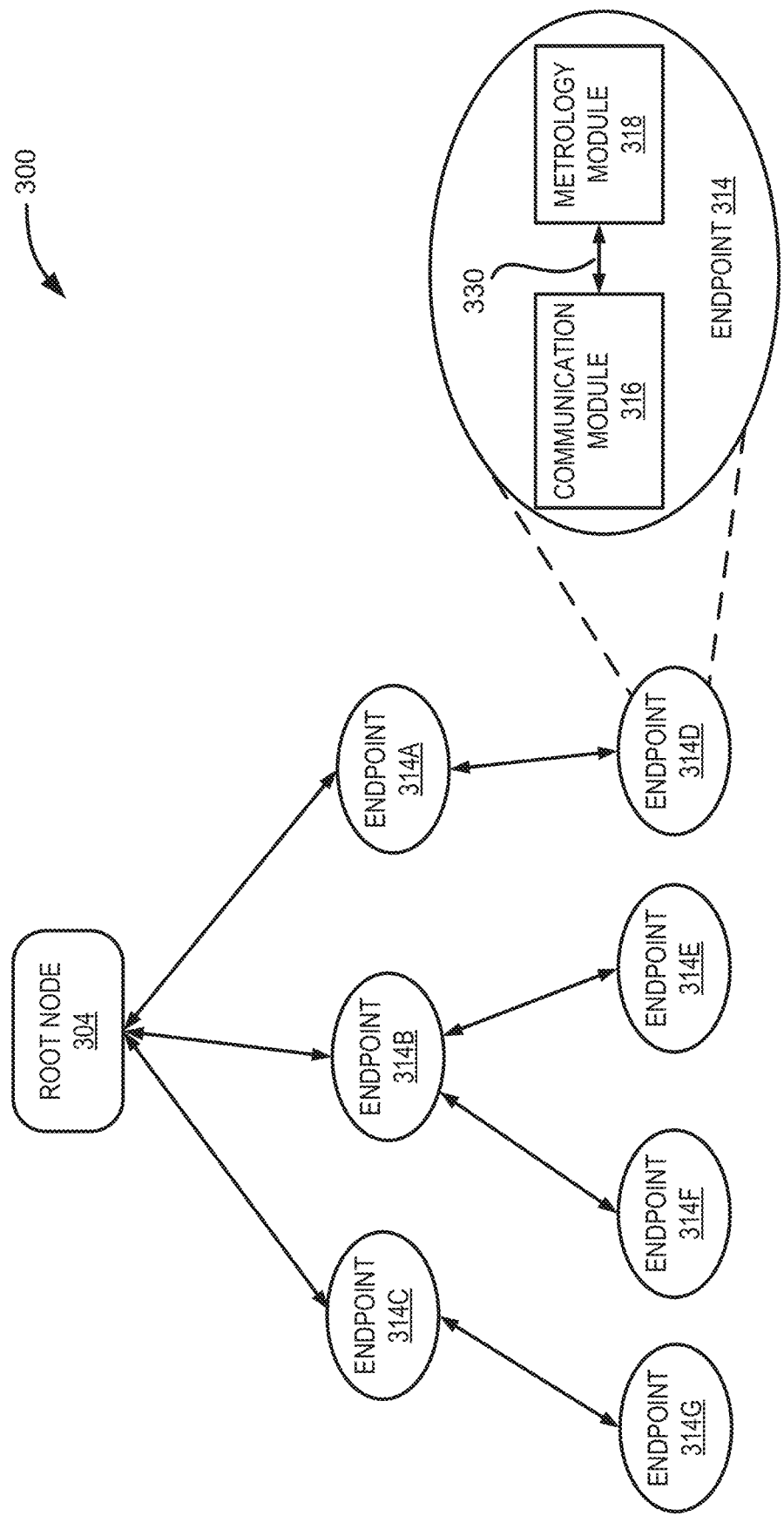
FIG. 3 is a diagram illustrating an example of a mesh network with extended network security to local connections between the communication module and the metrology module within an endpoint of the mesh network, according to certain embodiments of the present disclosure.

FIG. 3 shows a diagram illustrating an example of a mesh network 300 with extended network security to the local connection between a communication module and a metrology module within an endpoint of the mesh network, according to certain embodiments of the present disclosure. The mesh network 300 shown in FIG. 3 may be associated with a resource distribution network such as a water distribution network, an electric grid, or a gas distribution network. Endpoints 314A-314G (which may be referred to herein individually as an endpoint 314 or collectively as the endpoints 314) are installed in various locations of the resource distribution network.

Each of the endpoints 314 includes a metrology module 318 and a communication module 316. The metrology module 318 in an endpoint 314 is configured to measure various characteristics associated with the distribution network, such as power consumption, the peak voltage of the electricity, and so on. The metrology module 318 can be any type of meter in a utility network, such as an electricity meter, a gas meter, a water meter, a steam meter, etc. The communication module 316 in an endpoint 314 is configured to deliver measurement data obtained by the metrology module 318 to a root node 304 over the mesh network 300. The metrology module 318 and the communication module 316 are connected through a local connection 330, such as a USB connection, an RS232 serial port connection, a Bluetooth connection, a digital inter-chip connection or a combination thereof. In this example, the metrology module 318 is an edge device 118 and the communication module 316 is a network node 116 as described above with regard to FIG. 1.

The communication modules 316 in the endpoints 314 transmit the collected data through the mesh network 300 to a root node 304 which may further transmit the collected measurement data to a headend system via one or more additional networks (not shown in FIG. 3). The root node 304 may be personal area network (PAN) coordinators, gateways, or any other devices capable of communicating with the headend system. In some configurations, the root node 304 is also configured to be the network manager of the mesh network 300 to manage the security of the mesh network 300 as described above with regard to FIG. 1.

For example, the root node 304 can be configured to issue and maintain the security credentials and the network keys for the communication modules of the endpoints 314 and also for the metrology modules that have joined the mesh network 300 through the secured local connections as disclosed herein. The root node 304 may also be configured to authenticate communication modules and metrology modules of the endpoints 314 when they join the mesh network 300, update and revoke security credentials and network keys, remove network devices from the mesh network 300, and so on. The root node 304 may also be configured to manage the routing of the network traffic and communicate with the communication modules and metrology modules to establish routing information and may assign network addresses, such as IP address, LAN address or a combination thereof for new network devices. It should be noted that the mesh network 300 may include multiple root nodes each of which may have multiple endpoints associated therewith as described above.

Figure 4:
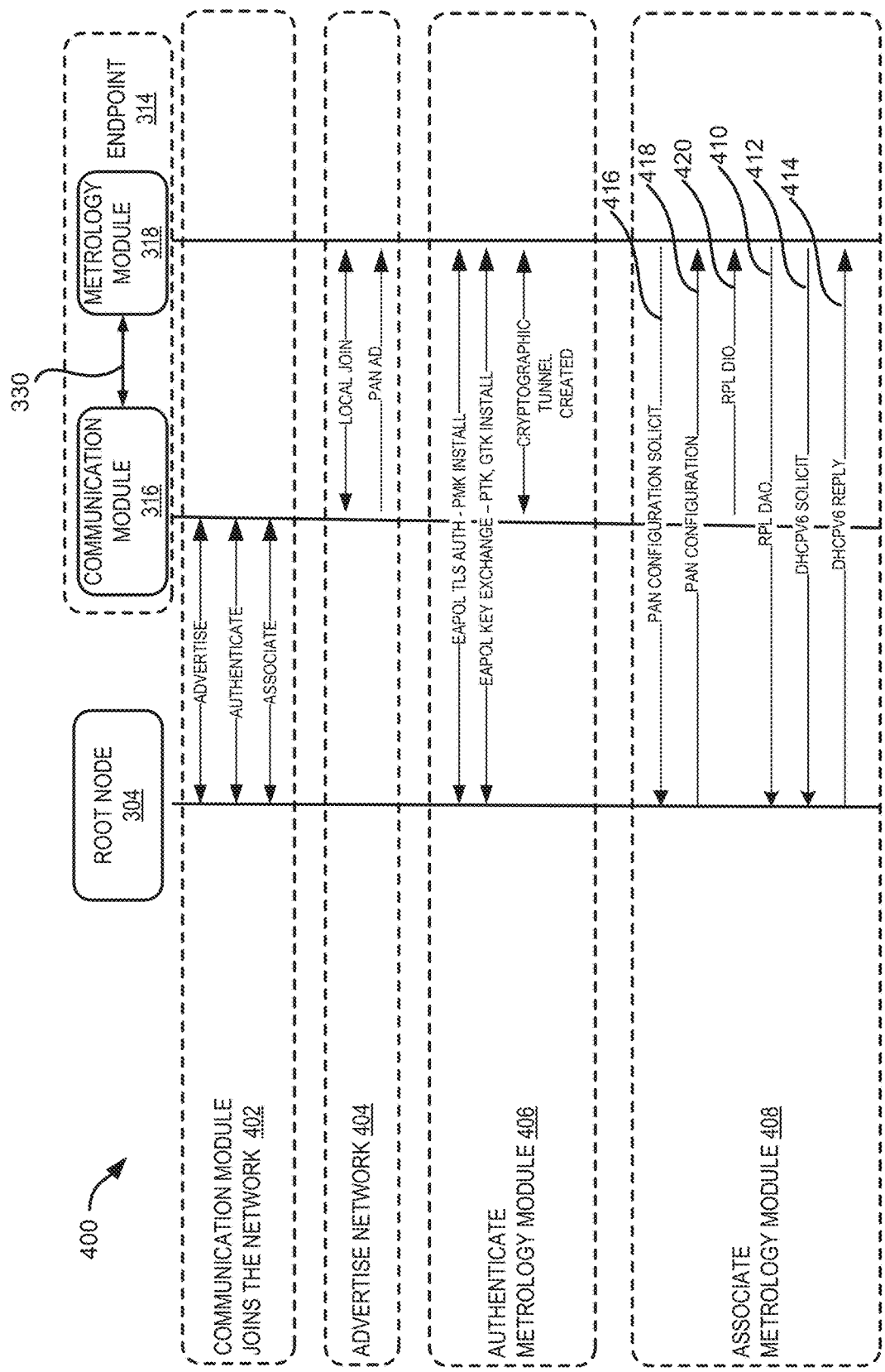
FIG. 4 is a diagram illustrating the exchange of messages between network managing devices and an endpoint, and between the network card and the edge device in the endpoint.

FIG. 4 depicts a signal flow diagram illustrating an example of a process 400 for extending the network security to a local connection between a network node and an edge device of an endpoint for the mesh network 300. In the example shown in FIG. 4, the communication module 316 is the network node and the metrology module 318 is the edge device. The root node 304 is configured to perform the functionality of the network manager. Depending on the network configuration, other nodes or devices in the mesh network 300 may also be configured as the network manager. As shown in FIG. 4, to extend the network security to the local connection within the endpoint 314, various messages are exchanged between the root node 304 and the endpoint 314 and between the communication module 316 and the metrology module 318 within the endpoint 314.

The process 400 includes four stages: the communication module joining stage 402, the network advertisement stage 404, the authentication stage 406 and the association stage 408. At the communication module joining stage 402, the communication module 316 joins the network 300 by following the normal operations and communications defined by the network protocol implemented in the network 300. This stage includes exchanging advertising messages between the communication module 316 and the root node 304 so that the communication module 316 can identify the proper network to join. The communication module 316 and the root node 304 further exchange messages for authenticating the communication module 316 and for associating the communication module 316 with the network 300.

After the communication module 316 joins the network 300, the process 400 proceeds to the network advertisement stage 404. In this stage, the metrology module 318 joins the communication module 316 locally through the local connection 330 instead of the network 300. In this way, the communication module 316 (i.e. network node) acts like a proxy for the metrology module 318 (i.e. edge device) for the join process. The communication module 316 sends an advertisement message, denoted as the "PAN AD" message in FIG. 4, to advertise the network to the metrology module 318. Different from the joining process of other types of network devices, the advertisement is performed over the local connection 330 instead of the network 300. At the authentication stage 406, the metrology module 318 communicates with the root node 304 to authenticate itself. In the example shown in FIG. 4, the metrology module 318 and the root node 304 exchange messages by following extensible authentication protocol (EAP) transport layer security (TLS) authentication protocol to authenticate the metrology module 318 and to issue and install pairwise master key (PMK) on the metrology module 318. The PMK can be a shared secret key for one or more sessions of communication and can be used to derive other types of keys in those sessions.

The metrology module 318 and the root node 304 further communicate EAPOL (EAP over LANs) key frames to exchange keys between them. For example, the metrology module 318 and the root node 304 can engage in a four-way handshake process to establish a pairwise transient key (PTK) used to encrypt traffic between two network devices, and a group temporal key (GTK) used to decrypt multicast and broadcast traffic. These keys can include a common key shared by multiple devices on the network 300 or a unique key for the metrology module 318. Once the keys are established and installed on the metrology module 318, the network layer security has been extended to the metrology module 318 through the security credentials and network keys. The communication module 316 and the metrology module 318 can communicate with each other over the local connection 330 using their respective network keys, thereby establishing a secure tunnel between them. With the established secure tunnel, the communication module 316 (network node) and the metrology module 318 (edge device) can communicate outside of the network 300 but in a secure manner utilizing the network security cryptographic controls (e.g., encryption, integrity check, etc.). In some examples, without the secure tunnel, the communications between the communication module and the metrology module are performed in plaintext with no encryption or integrity checks on the communication. As such, in some implementations, the communications between the communication module and the metrology module are not allowed until the secure tunnel is established. In other implementations, however, such unsecured communications are allowed to ensure data from the metrology module (edge device) are collected by the communication module (network node) prior to the establishment of the secure tunnel.

At the association stage 408, routing information for the metrology module 318 is exchanged and a data link between the metrology module 318 and the network 300 is established. The data link indicates that the communication between the metrology module 318 and other network devices on the network 300 always go through the communication module 316. At this stage, the metrology module 318 sends a message 416 to solicit information about the network configuration from the root node 304. The root node 304 replies back with the network configuration information 418 so that the metrology module 318 is properly configured on the network. The communication module 316 further sends an RPL (IPv6 Routing Protocol for Low-Power and Lossy Networks) DIO (Destination-Oriented Directed Acyclic Graph Information Object) message 420 to the metrology module 318 to remind the metrology module 318 to periodically advertise itself on the network 300. This RPL DIO message can also be sent from the root node 304 or another node that is configured as the network manager.

In response, the metrology module 318 sends an RPL Destination Advertisement Object (DAO) message 410 to the root node 304 to propagate its destination information (e.g., the address of the metrology module 318) to the network so that other nodes or devices on the network 300 know the current address of the metrology module 318 and can determine the routing to the metrology module. Sending the destination information to the root node 304 allows the root node 304 to maintain routing information. In other examples, the advertisement does not propagate to the root node and the routing is maintained locally. In either case, the route would always go through the communication module 316 (the network node) to which the metrology module 318 (the edge device) is connected. After the routing information is determined, the metrology module 318 can communicate on the network 300. The metrology module 318 further solicits the IP address from the root node 304 through a Dynamic Host Configuration Protocol version 6 (DHCPV6) solicit message 412 and the root node 304 replies with the assigned IP address using a DHCPV6 reply message 414. Once the metrology module 318 is assigned an IP address, the metrology module 318 is interconnected with and is reachable through IP addressing by other network devices on the network 300 including other communication modules 316 and metrology modules 318 that have been associated with the network 300 as described above. The metrology module 318 can operate similarly as other network devices except that the communications with the metrology module 318 occur through the communication module 316. As such, some communications such as peer to peer communication cannot be performed between other network devices and the metrology module 316. In some scenarios where the network 300 is a private utility network, the metrology module 318 is not connected to the public Internet. In other scenarios where a network device in the network 300 is connected to the public Internet, the metrology module 318 can also be connected to the public Internet. To prevent undesirable communication, the communication module (i.e., the network node) associated with the metrology module (i.e., the edge device) can be configured to only allow routing from a list of authorized addresses to prevent remote communication or interaction from devices which are not desired.

It should be appreciated that while process 400 is described with a focus on the mesh network 300, metrology modules, and communication modules, it can be applied to other types of networks, network nodes, edge devices, and local connections. Depending on the type of network and the employed network protocol, the messages being communicated among the network node, the edge device, and the root node/network manager might be different. Further, while the above discussion focuses on the scenarios where the metrology module 318 operates within an IP network, similar processes can be applied to the scenarios where the metrology module 318 operates outside an IP network and is configured to communicate with MAC layer messages.

In some scenarios, such as when a network node leaves the network or a network node joins the network, the routing information of the network needs to be updated. The movement of a network node may occur, for example, in a network migration, i.e. a device migrates from one network to another network, or in connection with a network failure, such as a power outage. In these scenarios, the process 400 described above can be performed for those network nodes that are impacted by the migration or power outage. In other words, the network node and its connected edge devices can join the new network or re-join the network by following the process 400.

Updates to network security can be performed by sending the security updates, e.g. key rolling, online certificate revocation, online certificate rolling, to the edge device. Removing an edge connected device from the network can be performed by the network manager by, for example, removing the IP address and routing information about the edge device from the network. Note that if the network node connected to the edge device is removed, the edge device can no longer receive information from the network and thus is effectively removed from the network.

In some scenarios, the security credentials of a locally connected edge device need to be revoked. For example, if an edge device is compromised, the network manager can be configured to revoke the security credentials of the edge device to protect the security of the network. In one example, the network manager generates new keys and new security credentials for all the network devices except for the edge device so that the security credentials for the edge device are revoked. In another example, the network manager can broadcast a message to every other network device on the network to instruct those devices not to communicate with the edge device. The network manager may also revoke an edge device by not issuing a new certificate to the edge device. Various other mechanisms can be utilized by the network manager to revoke the security credentials of an edge device. Note that if the network node connected to the edge device is revoked, the edge device can no longer receive information from the network and thus is effectively revoked.

It should be noted that revoking an edge device is different from removing the device from the network. Removing a device from the network may include removing the IP address of the device and routing information related to the device from the network. As a result, the removed device can no longer communicate with any other device on the network. Revoking a device does not necessarily include removing the IP address and routing information. As such, a revoked device may nonetheless communicate or otherwise listen to the network for information. For example, if revoking an edge device is performed by revoking the network security credentials for the edge device, the edge device might still have valid keys that allow it to communicate with certain nodes on the network such as listening to the broadcast or multicast traffic on the network. As a result, the revoked edge device is not immediately removed from the network. Note, however, that if the keys for the network are updated, the revoked device would no longer have the credentials to receive the updated keys. At this point, the revoked device could no longer participate or listen to the traffic of the network that is secured through encrypted messaging.

Figure 5:
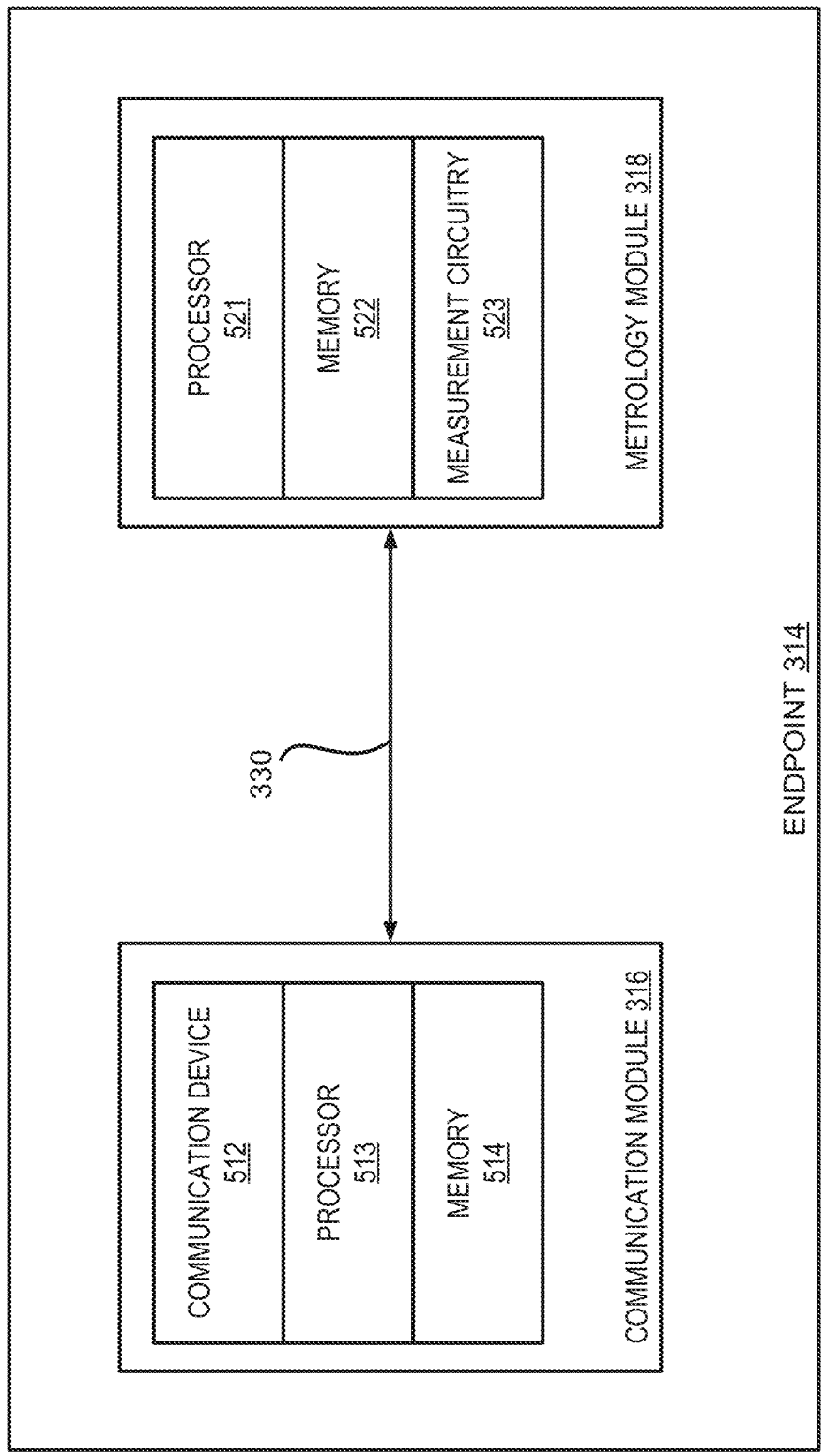
FIG. 5 is a diagram depicting an example of an endpoint that is suitable for implementing aspects of the techniques and technologies presented herein.

Referring to FIG. 5, which shows a diagram depicting an example of an endpoint 314 that is suitable for implementing aspects of the techniques and technologies presented herein. The endpoint 314 includes a communication module 316 and a metrology module 318 connected through a local connection 330. These two modules may be housed in the same unit on separate boards hence the local connection 330 may be an on-board socket. Alternatively, the modules may be housed separately and thus the local connection 330 may be a communication cable, such as a USB cable, or another conductor. Since these two components may be physically separate, the communication module 316 and the metrology module 318 may be removed or replaced independently of each other. The function of the communication module 316 includes receiving and sending messages through the network 300. The function of the metrology module 318 includes the functions necessary to manage the resource, in particular, to allow access to the resource and to measure the resource used. The communication module 316 may include a communication device 512 such as an antenna and a radio. Alternatively, the communication device 512 may be any device that allows wireless or wired communication. The communication module 316 may also include a processor 513, and memory 514. The communication device 512 is used to receive and send messages through the network 300. The processor 513 controls functions performed by the communication module 316 and the processor 513 utilizes memory 514 as needed.

The metrology module 318 may include a processor 521, memory 522, and measurement circuitry 523. The processor 521 in the metrology module 318 controls functions performed by the metrology module 318 and utilizes the memory 522 as necessary. The measurement circuitry 523 handles the measuring of the resource and may also handle the recording of measurements taken. Both the communication module 316 and the metrology module 318 may include computer-executable instructions stored in memory or in another type of computer-readable medium and one or more processors within the modules may execute the instructions to provide the functions described herein.

GENERAL CONSIDERATIONS

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art. For example, although a metering implementation has been used for illustration, the invention may be extended to any type of network endpoint that includes a communication module and a second module, separate from the communication module.

The invention claimed is:

1. A network endpoint device, comprising:
a network node connected to a network and configured to communicate with a network manager and other network nodes of the network, the network node having a first network address; and
an edge device connected to the network node via a local connection and configured to communicate with the network node through the local connection, wherein the edge device is configured for
communicating with the network manager via the network node to obtain security keys and security credentials of the edge device;
establishing a secure channel between the network node and the edge device over the local connection using the security keys and the security credentials;
communicating with the network manager via the network node to exchange routing information and to obtain a second network address for the edge device; and
communicating with another network node in the network via the network node using the security keys, the security credentials, and the second network address.

2. The network endpoint device of claim 1, wherein the first and the second network addresses each comprise one or more of an internet protocol (IP) address, or a local area network (LAN) address.

3. The network endpoint device of claim 1, wherein:
the network is a mesh network associated with a resource distribution network;
the network node is a communication module of the network endpoint device of the mesh network; and
the edge device is a metrology module of the network endpoint device configured for measuring characteristics associated with the resource distribution network.

4. The network endpoint device of claim 1, wherein the secure channel established between the network node and the edge device over the local connection is further based on security keys and security credentials of the network node.

5. The network endpoint device of claim 1, wherein the routing information specifies that the edge device is reachable through the network node.

6. The network endpoint device of claim 1, wherein the first network address and the second network address are different.

7. A method comprising:
authenticating, by an edge device connected to a network node of a network through a local connection, the edge device with a network manager of the network;
receiving, by the edge device via the network node, device credentials and network keys issued by the network manager based on the authentication;
creating, by the edge device and the network node, a secure tunnel between the edge device and the network node using the device credentials and network keys of the network node and the edge device;
establishing, by the edge device, a data link with the network; and
communicating, by the edge device via the network node, with other devices on the network via the network node and based on the data link.

8. The method of claim 7, further comprising:
sending, by the network node, an advertisement message to the edge device to advertise the network, wherein the network manager is identified by the edge device based on the advertisement message.

9. The method of claim 7, wherein establishing the data link with the network comprises:
obtaining configuration data from the network manager;
exchanging routing information with the network manager; and
obtaining a network address for the edge device from the network manager.

10. The method of claim 9, wherein the network address comprises one or more of an internet protocol (IP) address, or a local area network (LAN) address.

11. The method of claim 9, wherein the network address for the edge device is different from a network address of the network node.

12. The method of claim 9, wherein:
the network is a mesh network associated with a resource distribution network;
the network node is a communication module of an endpoint of the mesh network; and
the edge device is a metrology module of the endpoint configured for measuring characteristics associated with the resource distribution network.

13. A system comprising:
a network manager configured for managing communications between network devices of a network, the network devices comprising network nodes and edge devices;
an endpoint device in connection with the network manager through the network and managed by the network manager, the endpoint device comprising:
a network node connected to the network and configured to communicate with the network manager and other network devices, the network node having a first network address; and
an edge device connected to the network node via a local connection and configured to communicate with the network node through the local connection, wherein the edge device is configured for
communicating with the network manager via the network node to obtain security keys and security credentials of the edge device;
establishing a secure channel between the network node and the edge device over the local connection using the security keys and the security credentials;
communicating with the network manager via the network node to exchange routing information and to obtain a second network address for the edge device; and
communicating with another network device in the network via the network node using the security keys, the security credentials, and the second network address.

14. The system of claim 13, wherein the network address comprises one or more of an internet protocol (IP) address, or a local area network (LAN) address.

15. The system of claim 13, wherein the first network address and the second network address are different.

16. The system of claim 13, wherein the routing information specifies that the edge device of the endpoint device is reachable through the network node of the endpoint device.

17. The system of claim 13, wherein:
the network is a mesh network associated with a resource distribution network;
the network node is a communication module of the endpoint device of the mesh network; and
the edge device is a metrology module of the endpoint device configured for measuring characteristics associated with the resource distribution network.

18. The system of claim 13, wherein the network manager is further configured to update security of the network by removing an edge device from the network, the removing comprising removing a network address and routing information of the edge device from the network.

19. The system of claim 13, wherein the network manager is further configured for revoking security credentials of an edge device, comprising one or more of:
generating new keys and new security credentials for the network devices of the network except for the edge device;
broadcasting a message to the network devices of the network except for the edge device to instruct the network devices not to communicate with the edge device; or refraining from issuing a new certificate to the edge device.

* * * * *